Patented June 15, 1954

2,681,372

UNITED STATES PATENT OFFICE 2,681,372

MANUFACTURE OF ETHYL CHLORIDE AND VINYL CHLORIDE

Percy W. Trotter, Baton Rouge, La., assignor to Ethyl Corporation, New York, N. Y., a corporation of Delaware No Drawing. Application January 16, 1951,
Serial No. 206,315

2 Claims. (Cl. 260—656)

This invention relates to the manufacture of chlorinated hydrocarbons. More particularly, the invention is concerned with the production of vinyl chloride and ethyl chloride.

Vinyl chloride is a valuable starting material for the production of high polymer substances and is produced commercially by the hydrochlorination of acetylene or the substitution chlorination of ethylene. This latter process, although it utilizes ethylene, a more economical raw material than acetylene, requires elevated temperature and rather drastic operating conditions for good results. In addition, the hydrogen chloride produced as a by-product of a substitution reaction must be recovered and separately utilized.

The object of this invention is to provide a new reaction for the production of vinyl chloride. A further object is to provide a method whereby all the chlorine involved in the reaction is recovered as valuable organic chlorides. A more specific object is to provide a process for converting dichloroethane and ethylene to vinyl chloride and ethyl chloride in very high yields.

In general, my process comprises the reaction of an approximately equal molal mixture of dichloroethane and ethylene at elevated temperature and pressure and in the presence of a contact type catalyst. It has been found that the reactants above specified will react with virtually complete recovery of the desired products.

Either the 1,1- or 1,2-dichloroethane may be used for our process. However, in a specific embodiment to be hereafter described, it will be preferred to use the 1,2-isomer.

The manner of operating the process and of obtaining the benefits thereof will be more fully understood from the description and examples given below.

Example I

A supply of 1,1-dichloroethane was mixed in the vapor phase with ethylene in the proportion of 192 parts of dichloroethane and 70 parts of ethylene. This corresponded to a mole ratio of 0.78 mole of dichloroethane to 1 mole of ethylene. The mixture was then fed to a tubular reactor which was packed with a supply of anhydrous calcium sulfate catalyst. The reactor and contents were maintained by means of an external heat source at a temperature of approximately 260° C. and a pressure of about 300 pounds per square inch gauge. The feed gases were passed through the reactor at a rate providing a contact time of about 8 minutes. The effluent gases from the reactor were passed through a purification train consisting of an air-cooled cooler, a scrubber for removing residual traces of hydrogen chloride with water by absorption, a drying chamber and a final condenser for complete liquefaction of all condensable components. The products consisted of 37 parts by weight of ethyl chloride and 59 parts by weight of vinyl chloride. This corresponded to a recovery of 97 percent of the dichloroethane as vinyl chloride and a conversion and recovery of 46 percent of the ethylene to ethyl chloride. Only minor quantities of hydrogen chloride were recovered in the absorption. In addition to the above example, additional examples are summarized as Examples II, III, and IV in the following table.

|  | Example No. | | | |
| --- | --- | --- | --- | --- |
|  | I | II | III | IV |
| Feed, parts by weight: | | | | |
| Dichloroethane | 192 | 376 | 421 | 445 |
| Ethylene | 70 | 140 | 140 | 140 |
| Mole Ratio, $C_2H_4Cl_2:C_2H_4$ | 0.78 | 0.76 | 0.85 | 0.90 |
| Reactor temperature, ° C | 260 | 210 | 240 | 300 |
| Reactor pressure, lb. per sq. in | 300 | 300 | 300 | 300 |
| Contact time, min | 8.2 | 4.7 | 4.1 | 3.6 |
| Products, parts by weight: | | | | |
| Ethyl Chloride | 37.4 | 9.0 | 75.3 | 39.0 |
| Vinyl Chloride | 58.7 | 87.5 | 158.0 | 54.3 |
| Yield based on ethylene | 46.0 | 6.0 | 40 | 20 |
| Yield based on dichloroethane | 97.0 | 74.0 | 100 | 33 |

It will be apparent from the foregoing examples that the process affords an efficient mode of converting dichloroethane to vinyl chloride and simultaneously converting ethylene to ethyl chloride. The process is advantageous in numerous different circumstances. For example, the 1,1-isomer of dichloroethane is normally produced in substantial quantities as a by-product of ethane chlorination. This material, however, finds little usage in industry in contrast to the 1,2-isomer. The process is therefore particularly beneficial in conjunction with a chlorination of ethane.

The process also provides a highly desirable degree of flexibility in conjunction with an ethylene chlorination plant. In a preferred embodiment under such circumstances it has been found that an ethylene supply can be partially chlorinated to ethylene dichloride (1,2-dichloroethane), thereby providing a product mixture consisting of the dichloroethane and ethylene. This mixture is then used as the feed stream to the present process and as already demonstrated, vinyl chloride and ethyl chloride produced to good yields. This embodiment therefore permits an ethylene chlorination plant to be utilized as the starting point in ethylene dichloride or vinyl chloride and ethyl chloride manufacture according to market demands.

As already indicated, the process is necessarily carried out at elevated temperatures in order to provide an appreciable reaction rate. The operating temperature within the reactor should be at least 200° C. and preferably of the order of 250° to 350° C. The reactor pressure is maintained at an elevated level. At atmospheric pressure the reaction of the ethylene with hydrogen chloride does not occur. For best results, it is preferred to use a reactor pressure of from about 100 to 400 pounds per square inch. Somewhat higher and lower pressures can also be utilized, although there are incidental disadvantages to deviating from the preferred range. The catalyst as cited in the foregoing examples was prepared according to the method of U. S. Patent 1,887,349. Although this form of anhydrous calcium sulfate is quite advantageous in that no polymerization was observed, other inorganic surface catalysts can be employed and fully satisfactory results obtained. Examples of such catalysts are active carbon, silica gel, diatomaceous earth and other surface catalysts known to the art. It is preferred that the gases fed be contacted with the surface catalyst at reaction conditions for a period of at least 3 minutes, the usual operating range being approximately 4 or 5 minutes contact time. In rare cases, such as for example, if the feed materials are diluted with an appreciable quantity of non-recoverable gases, higher contact times will be necessary. In general, a contact time of more than 10 minutes is seldom if ever used.

The process is capable of numerous specific embodiments in addition to the examples given above, without departing from the scope of the invention as defined by the following claims.

I claim:

1. Process of producing ethyl chloride and vinyl chloride comprising reacting a dichloroethane and ethylene in the ratio of from 0.5 to 1.5 moles of dichloroethane to 1 mole of ethylene in the presence of anhydrous calcium sulfate catalyst and at a temperature of 250° to 350° C. and a pressure of 100 to 400 pounds per square inch, the reaction being carried out for a period of at least three minutes.

2. Process of claim 1 wherein the dichloroethane is 1,1-dichloroethane.

References Cited in the file of this patent

UNITED STATES PATENTS

| Number | Name | Date |
| --- | --- | --- |
| 2,110,141 | Roush et al. | Mar. 8, 1938 |
| 2,446,124 | Boyd | July 27, 1948 |
| 2,485,524 | Basdeskis | Oct. 18, 1949 |
| 2,569,923 | Cheney | Oct. 2, 1951 |

FOREIGN PATENTS

| Number | Country | Date |
| --- | --- | --- |
| 894,546 | France | Dec. 27, 1944 |